United States Patent [19]

Clegg

[11] Patent Number: 4,650,284
[45] Date of Patent: Mar. 17, 1987

[54] PRISMATIC BEAM CONCENTRATOR

[76] Inventor: John E. Clegg, 2320 Keystone Dr., Orlando, Fla. 32806

[21] Appl. No.: 661,509

[22] Filed: Oct. 16, 1984

[51] Int. Cl.$^4$ .............................................. G02B 5/04
[52] U.S. Cl. .................................... 350/286; 126/440
[58] Field of Search ................ 350/286; 126/438, 440, 126/417; 159/15

[56] References Cited

U.S. PATENT DOCUMENTS

| | | | |
|---|---|---|---|
| 2,405,960 | 8/1946 | Land | 350/286 |
| 2,881,654 | 4/1959 | Toffolo | 350/286 |
| 2,882,784 | 4/1959 | Toffolo | 350/286 |
| 3,947,086 | 3/1976 | Hunzinger | 350/286 |
| 4,527,546 | 7/1985 | Clegg | 126/440 |

FOREIGN PATENT DOCUMENTS 119260 9/1979 Japan .

OTHER PUBLICATIONS

Price, "Collimated Light Beam Expander-Compressor", *Xerox Disclosure Journal*, vol. 6, No. 5, Sep./Oct. 1981, pp. 253-254.
Mannigel, "Prismatic Beam Expansion", *Optical Engineering*, vol. 13, No. 4, Jul./Aug. 1974, p. G-160-161.

*Primary Examiner*—John K. Corbin
*Assistant Examiner*—Vincent J. Lemmo

[57] ABSTRACT

A bilateral prism having two angular wedge faces which receive two convergent incipient beams of indirect sunlight and having two angular V-groove faces which emit a concentrated sheet beam. The prism is mounted on a rectangular block with angular lateral sides. The angle of the sides is such that two or three prisms can be mounted side by side with adjacent sides in contact so that the projected concentrated sheet beams converge onto a heat duct through which water or air circulate.

1 Claim, 2 Drawing Figures

PRISMATIC BEAM CONCENTRATOR

BACKGROUND OF THE INVENTION

The invention relates to optics, specifically to prisms.

The use of prisms for the refracting of beams in one dimension is well established in the art. A beam transmitted into a prism through a perpendicular face and refracted out of the prism through an angular face is reduced in width. Prismatic beams are afocal, and this means that a beam can be refracted and reduced in width several times. This is illustrated in Sanagi's *Luminous Flux Apparatus Using Prisms*, Japan Pat. No. 119,260.

SUMMARY OF THE INVENTION

The use of indirect sunlight as a source of energy imposes the problem of how to derive enough heat from such a low-heat source to make the system economically feasible. The heat content of diffused sunlight is very low, and this means that a very large incipient beam must be reduced in width to a very small concentrated beam.

One solution of the problem is to use two or more prisms stacked vertically in stages to reduce the width of the beam several times. This is known as multiple concentration, and it has been used successfully in several patented beam concentrators.

The disclosure offers an alternative to multiple concentration. Instead of stacking a number of prisms vertically to produce successive concentrations of a beam, a number of prisms with tapered rectangular blocks can be arranged in a semicircle around a heat duct so that the concentrated rays converge on the surface of the duct. Moreover, the alternative offers a slight advantage when a duct with a large diameter is used, because a number of concentrated beams converging from different angles are displayed more evenly on the surface of the duct than a single beam.

DETAILED DESCRIPTION OF THE PREFERRED EMBODIMENT

Figure 1:
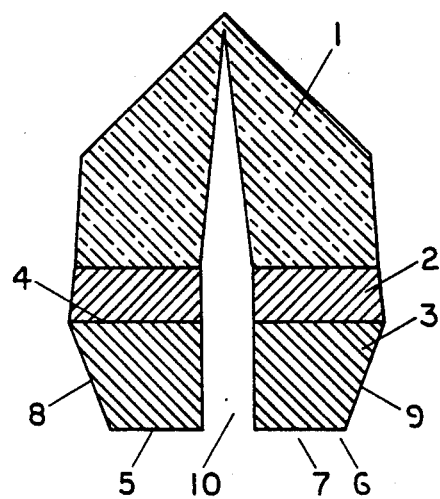
FIG. 1 is an elevation of the prismatic beam concentrator with the prisms shown in section.

FIG. 1 is an elevation of the prismatic beam concentrator comprising a bilateral prism 1, an intermediate adjoining section 2 and a tapered rectangular block 3. The prism is bisected by the vertical prismatic plane (not shown).

Tapered rectangular block 3 is a solid bound by six planar sides; two opposed parallel upper and lower sides 4 and 5, two opposed parallel front and rear sides 6 and 7, and two opposed lateral sides 8 and 9 inclined at equal angles to the vertical prismatic plane. A rectangular slot 10 is located in the center of the block to serve as an aperture through which the concentrated beam passes.

Figure 2:
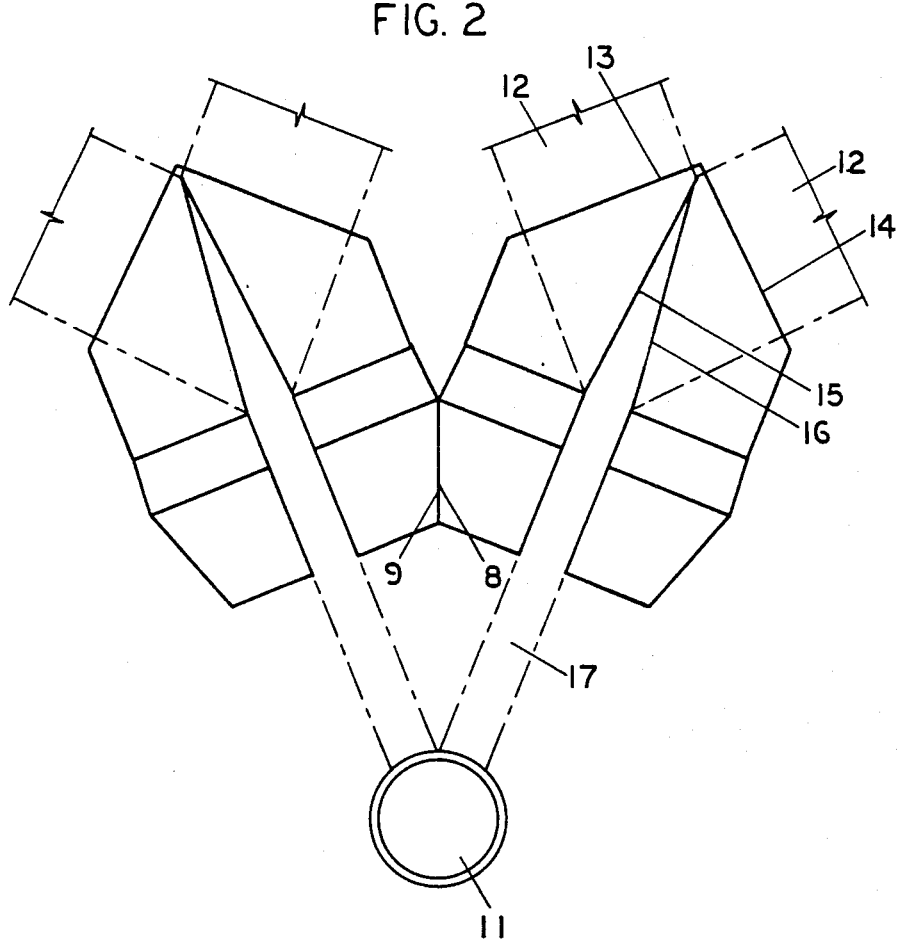
FIG. 2 is an elevation of the concentrator with a ray diagram.

FIG. 2 shows two concentrators mounted side by side above a horizontal heating duct 11. Lateral side 8 of the concentrator on the right is in contact with lateral side 9 of the concentrator on the left. Two convergent rectangular incipient beams 12 of diffused sunlight are received and transmitted into the prism by two angular wedge faces 13 and 14 and refracted and emitted by two angular V-groove faces 15 and 16, forming concentrated sheet beam 17 which is emitted through slot 10 onto conduit 11.

The purpose of tapered rectangular block 3 is to provide semicircular alignment of two or more prisms around the heat duct so that the concentrated beams will converge on the surface of the duct as shown in FIG. 2. The outermost incipient beams should not fall below the horizon, and this means that a maximum of three prisms can be used effectively when the heat duct is mounted horizontally.

I claim:

1. A prismatic beam concentrator comprising in general a bilateral prism which receives two convergent rectangular incipient beams of diffused sunlight and emits a concentrated sheet beam onto a heat duct as a source of solar heat, and comprising in particular;

a bilateral prism (1) having two opposed angular wedge faces (13,14) which receive and transmit into said prism (1) two convergent rectangular incipient beams (12) of diffused sunlight, and having two opposed V-groove faces (15,16) which refract and emit said convergent rectangular incipient beams (12), forming a concentrated sheet beam (17) which is emitted in the prismatic plane onto a heat duct (11), an intermediate adjoining section (2) mounted below said bilateral prism (1), and a tapered rectangular block (3) mounted below said intermediate adjoining section (2) and having two opposed lateral sides (8,9) inclined at equal angles to the prismatic plane of said bilateral prism (1) so as to serve as aligning surfaces of adjacent tapered rectangular blocks (3), the purpose of said aligning surfaces being to project two or more said concentrated sheet beams (17) of bilateral prisms (1) onto said heat duct (11), said tapered rectangular block (3) having a rectangular slot (10) located in the center thereof to serve as an aperture through which said concentrated sheet beam (17) passes.

* * * * *